Patented Sept. 3, 1940

2,213,330

UNITED STATES PATENT OFFICE 2,213,330

METHOD FOR TREATING INDUSTRIAL EFFLUENTS

Oscar Walter Wahlstrom, Monroe, La.

No Drawing. Application January 17, 1938, Serial No. 185,445

1 Claim. (Cl. 210—2)

This invention relates to methods for treating sulphate and sulfite paper mill effluents.

The principal object of the invention is to provide a method whereby noxious and injurious gases and fluids emanating from paper mill liquors are so treated that their effects are reduced to a degree which are neither objectionable nor injurious.

Another object of the invention is to provide a method for subjecting paper mill wastes to the action of a treating material which will reduce the toxic effects of the effluent with reference to fish or other forms of aquatic life.

Still another object is to provide a method of adsorption and stabilization for sulphur containing compounds which will prevent their decomposition and the production of gases and release to atmosphere and subsequent corrosion of certain metals and oxidation of the inorganic constituents of paints, even when present in very dilute concentrations.

Still another object of the invention is to subject the accumulation of sludge deposits high in sulphur compounds resulting from paper mill effluents to a series of treatments whereby the sulphur compounds contained therein are progressively stabilized to a point where they are not productive of hydrogen sulphide or other sulphur containing gases.

Yet another object of the invention is to periodically test the waste liquors from paper mills and to determine the quantity of reagent necessary to maintain the properties of the liquor below a definite, predetermined, and stable value at all times.

Still another object of the invention is to provide a method for the removal of fibrous material and solid chemical constituents from paper mill effluents, which heretofore have passed through the conventional rotary filters, but which fibers and constituents by the method hereindescribed may now be recovered for reuse.

Heretofore, paper mills have emptied their untreated effluents directly into streams, rivers, sewage systems or into storage basins. The effects resulting therefrom have been definitely injurious to human beings, destructive to paints and certain metals, as well as polluting streams.

The present invention contemplates the treating of paper mill effluents with a material, preferably activated carbon, in quantities sufficient to reduce the undesirable properties of the effluents below a predetermined value, permitting of its storage for such periods of time as may be necessary or until streams or rivers into which the effluent is discharged are flowing in sufficient volume to permit of sufficient dilution, which is essential because of the presence of organic constituents which, due to their nature have an excessively high oxygen demand. Discharge into streams or rivers can therefore only be made periodically and at such times during which by reason of rainfall such dilution will be effected as will permit of satisfying the oxygen demand without lowering the undissolved oxygen in the water to a point below which aquatic life cannot exist.

In present practice the pulp which has been processed in paper mills is separated from the liquor by the use of rotary filters. However, due to high capacity and tremendous volumes, a certain percentage of the fiber is lost by passing through the filters and out with the effluent.

The present invention contemplates the provision of filtration of fibrous material and solid chemical constituents from paper mill effluents, thereby supplementing the treating of the effluent as hereinabove explained. Sand filters, or other applicable types of filters may be employed. Moreover, the step of filtration provides for the recovery of the solid particles for reuse, thereby resulting in a net economic gain.

It is pointed out that the fiber is a carrier of sulfur compounds, which obviously cannot be removed by treatment with activated carbon or other adsorbent materials, since the sulfur compounds are positioned within the structure of the fiber particles. Release of the sulfur compounds within the fibers is effected by the gradual dissociation of the fiber particles. Hence by the elimination of the particles by filtration, the contamination of mill effluents in storage basins and pollution of streams is eliminated, it being understood that the effluent is also treated with activated carbon or other suitable material to adsorb sulfur compounds contained therein.

The solid constituents in the effluent, which are removed by the filtration hereindescribed, are destructive because of the high toxic condition with reference to the chemical constituents, and furthermore it has been found that the fiber particles accumulate in the gills of fish, thus causing their suffocation.

Moreover, during the clean-up operations and as a part of natural operating procedure, accumulations of sludge consisting of compounds used in the production of pulp have heretofore been discharged into the mill effluent stream. This material is very high in sulfur compounds, and the removal of said compounds from the sludge is accomplished only by leeching, and the resultant dissolving of the chemical constituents, which requires varying periods of time. It will be seen that unless the sludge above described is removed from the effluent, a contamination of the effluent subsequent to the carbon treatment will result. By the present method of filtration, the sludge is removed from the effluent, and hence the effect of the release of sulfur compounds into the effluent is eliminated.

The quantity of reagent required to reduce the properties of the effluents to the desired value is determined by the lead acetate test which is conducted as follows:

*Quantitative estimation of sulphide sulphur*

The method is a colorimetric method and consists essentially of the comparison of the depth of color of lead sulphide stains obtained from the sulphide sulphur of a given weight of a sample to be analyzed with a standard series of stains prepared from sulphide solutions of known sulphur content.

A set of stains prepared from sodium sulphide in accordance with the method as hereinafter set forth will vary in depth of color from a faint yellowish brown to black. With a set of standard stains at hand the method has the advantage that within the range given the sulphide sulphur of a sample may be determined in less than ten minutes.

*Preparation of standard set of sulphide stains*

50 cc. Florence flat bottom flasks are used. A brass ring is made to fit snugly over the top of the flask allowing sufficient clearance for the filter paper—a hole (about 2 mm. in diameter) is drilled in the top of the brass ring for the passage of steam through the filter paper to atmosphere.

Before applying the filter paper to the top of the flask it is moistened with normal lead acetate solution. The size of the filter paper being 3 mm. in diameter. This size piece of filter paper is moistened with 8 drops of the lead acetate solution—just before making the test.

A solution of sodium sulphide is made up with pure distilled water and carefully standardized. The solution is diluted to contain exactly 0.01% of sulphide sulphur. This solution is used for making up standard solutions, taking care to use distilled water free from traces of nitrites in making the dilutions.

Carefully measured portions of the 0.01% sulphide sulphur solution are used in preparing the standards for stains showing the sulphide sulphur in parts per million, as follows:

|        | Parts per million |
|--------|-------------------|
| 2.5 cc | |
| 5.0 cc | 1 |
| 7.5 cc | 2 |
| 10.0 cc | 3 |
| 12.5 cc | 4 |
| 15.0 cc | 5 |
| 17.5 cc | 6 |
| 20.0 cc | 7 |
| 22.5 cc | 8 |
| 25.0 cc | 9 |
|  | 10 |

As soon as the proper number of ccs. have been added to 25 cc. of HCl solution (5 cc. of C. P. HCl in 1 liter of distilled water) applying lead acetate moistened filter paper and fasten the brass ring and place the ring stand and bring to boil in about 3 minutes. As soon as brought to boil, remove from the flame and remove the brass ring and place filter paper in oven to dry.

In this way the sulphide sulphur is quantitatively liberated as hydrogen sulphide and evenly deposited as lead sulphide on the moistened lead acetate paper.

In testing the sample 5 cc. of the sample is carefully measured into 25 cc. of the dilute HCl solution—the lead acetate moistened filter paper is immediately applied and clamped with the brass ring and the solution brought to a boil following which it is oven dried and the stain is compared with standard stains previously prepared for determining the ppm of sulphide sulphur.

*Solutions*

Hydrochloric acid.—5 ccs. of C. P. HCl in 1 liter.
Lead acetate.—100 grams in 1 liter.
Sodium sulphide.—0.7445 gram in 1 liter—0.01% $Na_2S$ solution.

In order to determine the proper carbon dosage a 1-liter sample of the effluent is treated with varying percentages of activated carbon. After the carbon is applied to the effluent it is agitated at approximately 100 R. P. M. for 6 hours or more as the result of the test may indicate, after which a 5 cc. sample is used and the lead acetate test is made.

Sulfur compounds are definitely locked within the interstices of the activated carbon, as is demonstrated by tests made with an oxygen bomb, which yielded 0.06% sulfur on the carbon employed, and 0.18% sulfur on the carbon after its use as a treating agent—on a paper mill effluent. Moreover the sulfur compounds are not released from the carbon by an acid treatment.

It is understood that various changes in the steps and in the manner of carrying out the method herein may be made without departing from the spirit or intent of the invention as set forth in the appended claim.

What is claimed is:

The process for reducing the sulfide sulphur evaluation of sulphur bearing compounds contained in paper mill waste liquors below a predetermined value, which comprises initially in filtering said liquors below a predetermined value through a non-reactive and granular filtering medium, in continuously introducing into said filtered liquors a quantity of activated carbon regulated as a function of the sulphur evaluation of said liquors, and in periodically recovering the material entrapped by said granular filters for return for processing operations.

OSCAR WALTER WAHLSTROM.